US009656649B2

(12) United States Patent
Jennek et al.

(10) Patent No.: US 9,656,649 B2
(45) Date of Patent: May 23, 2017

(54) BRAKE ACTUATOR FOR A BRAKING SYSTEM OF A VEHICLE, AND METHOD FOR BRAKING A VEHICLE

(71) Applicant: SIEMENS AKTIENGESELLSCHAFT, Munich (DE)

(72) Inventors: Steffen Jennek, Neuried (DE); Toni Schiffers, Erkelenz (DE)

(73) Assignee: SIEMENTS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/025,307

(22) PCT Filed: Sep. 10, 2014

(86) PCT No.: PCT/EP2014/069299
§ 371 (c)(1),
(2) Date: Mar. 28, 2016

(87) PCT Pub. No.: WO2015/043954
PCT Pub. Date: Apr. 2, 2015

(65) Prior Publication Data
US 2016/0207513 A1 Jul. 21, 2016

(30) Foreign Application Priority Data
Sep. 26, 2013 (DE) .......................... 10 2013 219 438

(51) Int. Cl.
*B60T 13/66* (2006.01)
*B60T 17/22* (2006.01)

(52) U.S. Cl.
CPC .......... *B60T 13/665* (2013.01); *B60T 17/228* (2013.01)

(58) Field of Classification Search
CPC ............................ B60T 17/228; B60T 13/665
See application file for complete search history.

(56) References Cited

U.S. PATENT DOCUMENTS 9,079,591 B2 * 7/2015 Jennek .................... B60T 7/042
2009/0057072 A1 3/2009 Wood et al.

FOREIGN PATENT DOCUMENTS

| DE | 102004041672 A1 | 4/2005 |
| DE | 102011006002 A1 | 9/2012 |
| DE | 102012014885 A1 | 1/2014 |
| WO | 2012126946 A2 | 9/2012 |

* cited by examiner

*Primary Examiner* — Yuen Wong
(74) *Attorney, Agent, or Firm* — Laurence Greenberg; Werner Stemer; Ralph Locher

(57) ABSTRACT

A brake actuator for a braking system of a rail vehicle is configured to detect an anti-skid corrected braking target value from a brake control, or has an anti-skid correction device configured to correct the braking target value detected by the brake control by a reduction signal of an anti-skid control device to the anti-skid corrected braking target value. To improve the controllability of the brake actuator, an anti-skid monitoring device is provided, to which the anti-skid corrected braking target value and the brake target value are applied, and is configured to switch from a first position to a second position under at least one predefined first switching condition, and to switch from the second position back to the first position under a second switching condition. In the first position, the anti-skid corrected braking target value is provided.

20 Claims, 4 Drawing Sheets

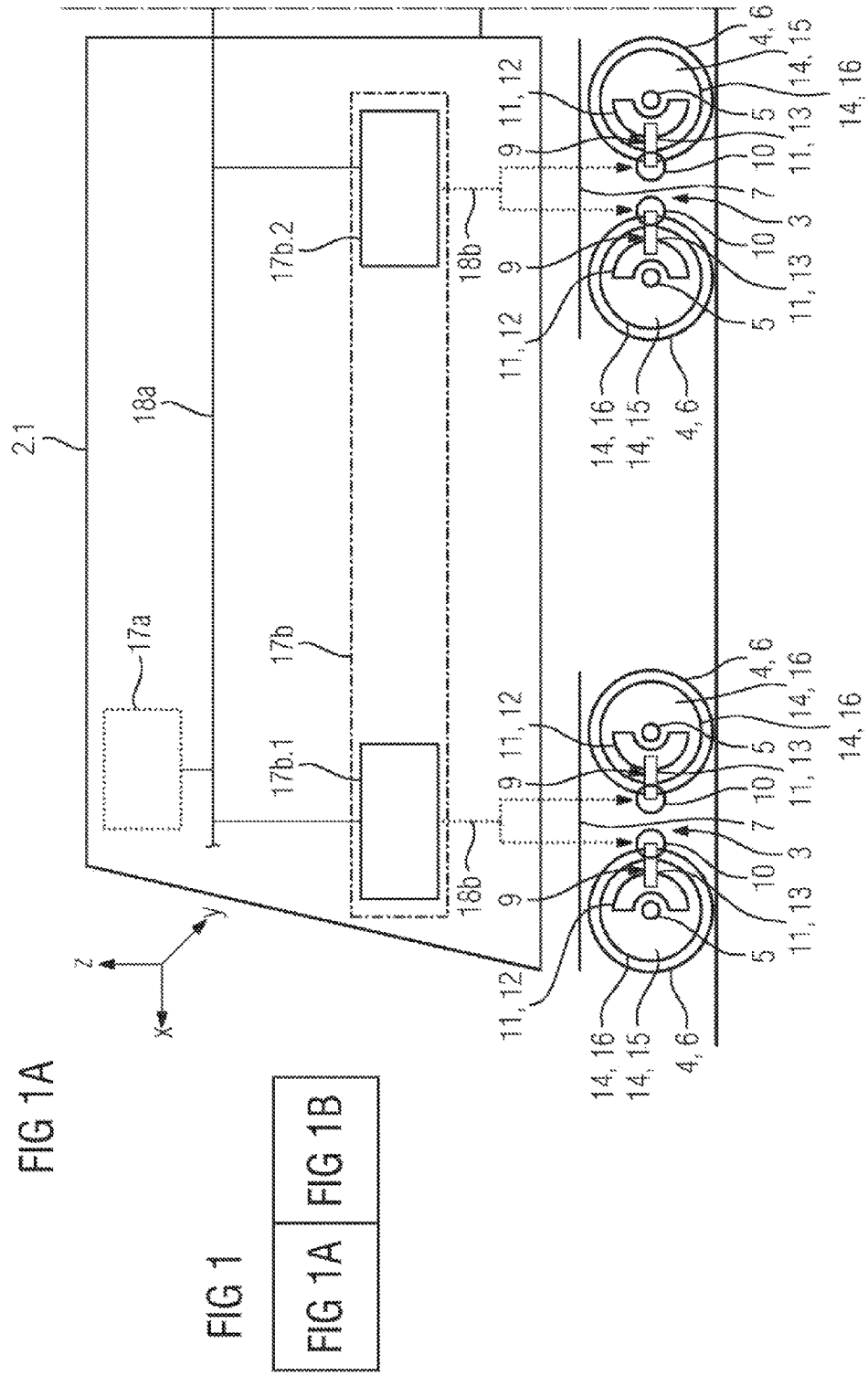

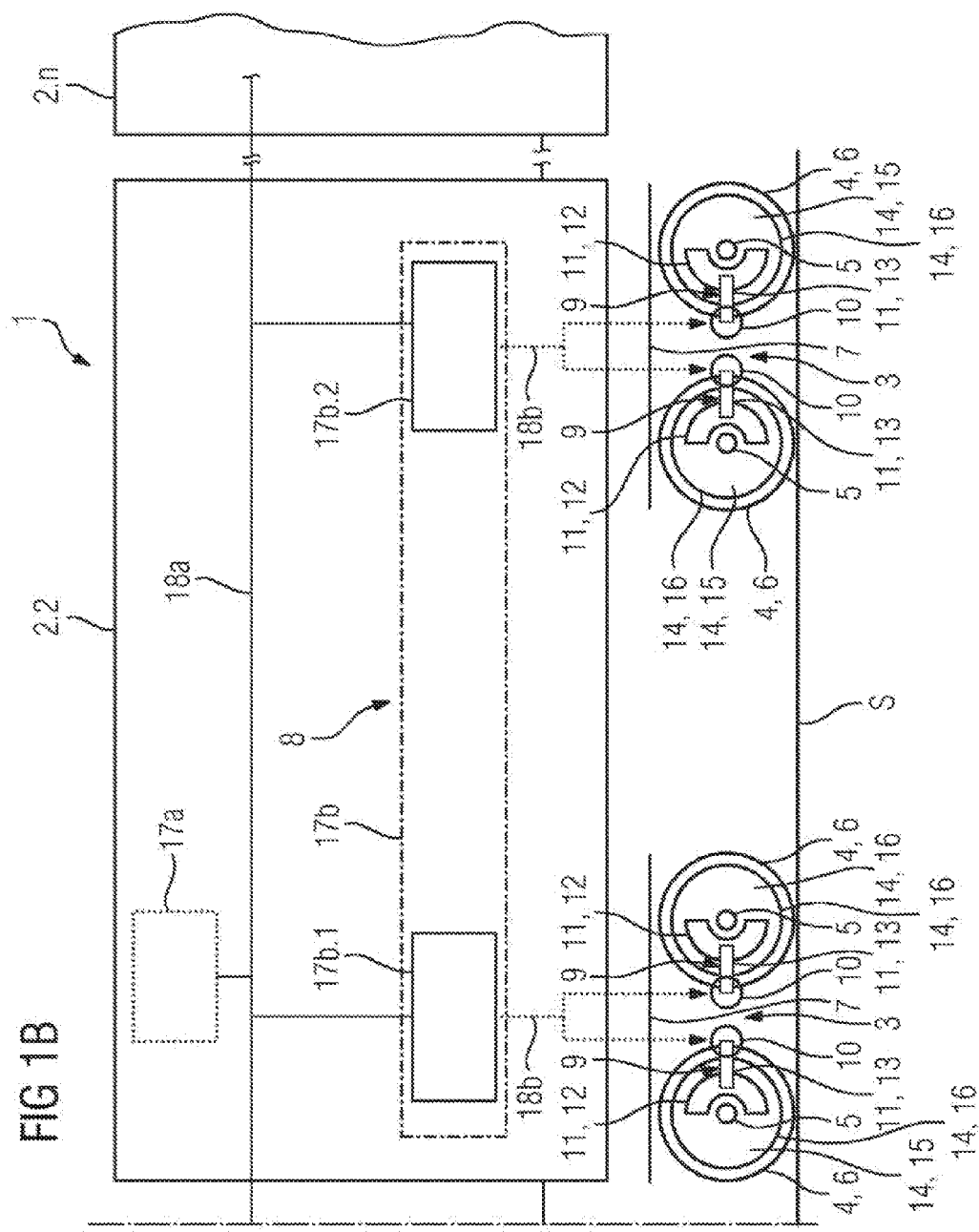

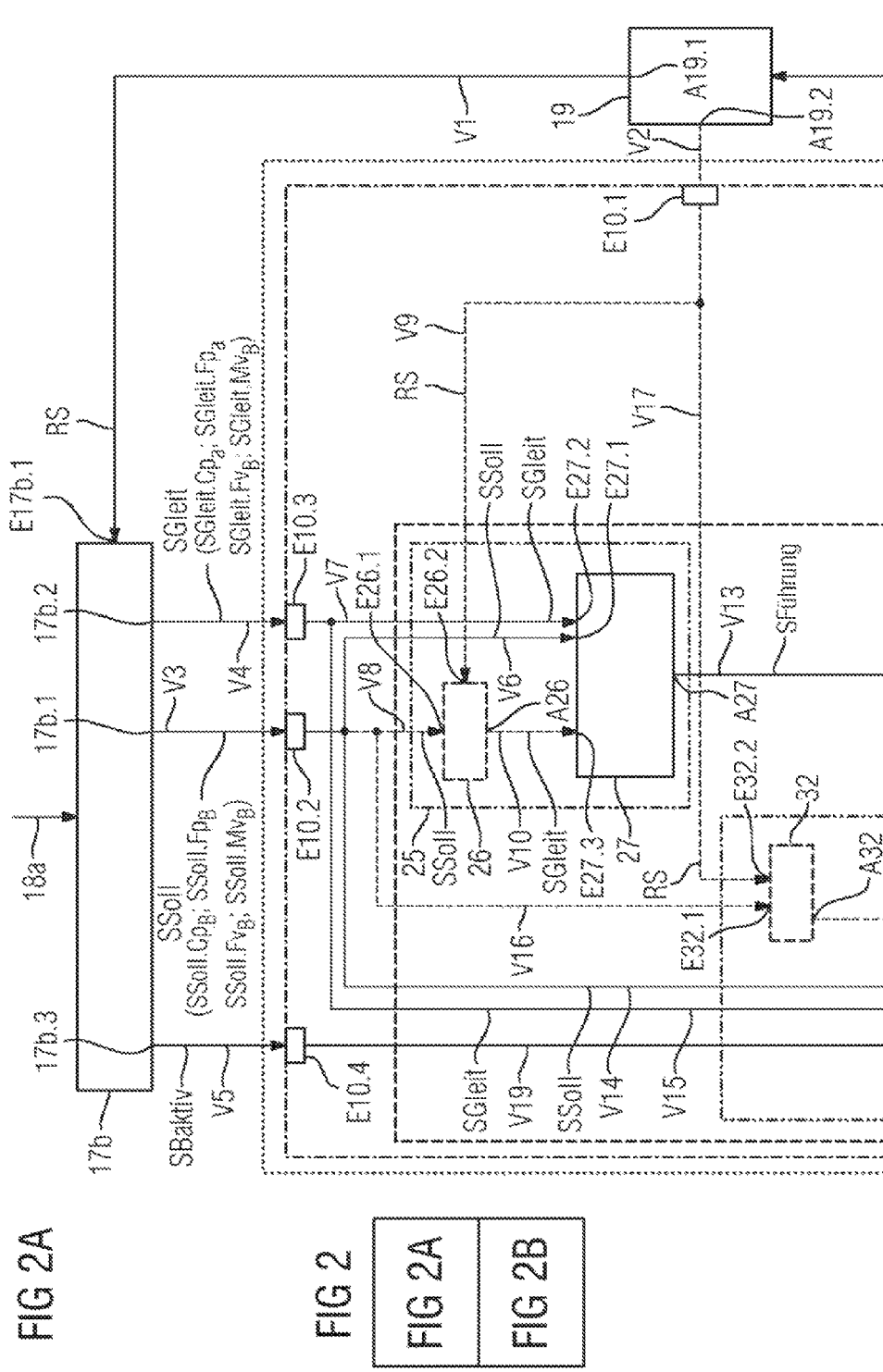

BRAKE ACTUATOR FOR A BRAKING SYSTEM OF A VEHICLE, AND METHOD FOR BRAKING A VEHICLE

BACKGROUND OF THE INVENTION

Field of the Invention

A braking system of a vehicle provided with wheel slide protection—as prescribed for example in the documents UIC541-05 and EN15595—in addition to the control of the wheel slide protection, also needs independent monitoring of the wheel slide protection in order to prevent an impermissible reduction of the braking force.

In pneumatic braking systems known from practical applications, a wheel slide protection valve device with a vent valve and a holding valve serves as the wheel slide protection. In this case activation times for the vent valve and the holding valve are monitored for example. If one of the activation times exceeds a predetermined threshold value, an independent wheel slide monitoring system in the form of a hardware circuit switches off the wheel slide protection valve device and thus deactivates the wheel slide protection, so that the full braking force is built up again.

The said hardware solution cannot be applied however when intelligent brake actuators, which obtain a wheel slide protection corrected braking target value or a reduction signal for forming a wheel slide protection corrected braking target value via a bus or via analog values, are used.

BRIEF SUMMARY OF THE INVENTION

The invention relates to a brake actuator for a braking system of a vehicle, in particular a rail vehicle, which is suitably configured to acquire a wheel slide protection corrected braking target value from a brake control or has a wheel slide protection correction device that is suitably configured to correct a braking target value acquired by the brake control by means of a reduction signal of a wheel slide protection regulation device to the wheel slide protection corrected braking target value.

The invention also relates to a braking system for braking a vehicle, especially a rail vehicle, in which first and second braking means assigned to one another and a brake actuator of this type, which includes a target value to force conversion device for actuating the first braking device for friction locking with the second braking means, form a braking device that is suitably configured for converting an output signal present at an input of the target value to force conversion device into an actual braking value.

The invention further relates to a vehicle, especially a rail vehicle, with such a braking system.

The invention also relates to a method for braking a vehicle, especially a rail vehicle, in which a brake actuator acquires a wheel slide protection corrected braking target value from a brake control or a wheel slide protection correction device of the brake actuator corrects a braking target value acquired from the brake control by means of a reduction signal of a wheel slide protection monitoring device to the wheel slide protection corrected braking target value.

A generic brake actuator and a generic method for braking a vehicle are known for example from publication WO 2012/126946 A2.

The underlying object of the invention is to improve the ability to regulate such a brake actuator.

The object is achieved by a brake actuator in which a wheel slide protection monitoring device is provided, at which the wheel slide protection corrected braking target value and the braking target value are available and which is suitably configured to switch from a first position to a second position under at least one predefined first switching condition, and to switch from the second position back to the first position under at least one predefined second switching condition, wherein in the first position the wheel slide protection corrected braking target value and in the second position the braking target value are provided as a reference target value at the output of the wheel slide protection monitoring device.

This object is also achieved by a method in which a wheel slide protection monitoring device of the brake actuator acquires the wheel slide protection corrected braking target value and the braking target value and in which the wheel slide protection monitoring device switches from a first position to a second position under at least one predefined first switching condition, and switches from the second position back to the first position under at least one predefined second switching condition, wherein in the first position the wheel slide protection monitoring device provides the wheel slide protection corrected braking target value and in the second position the braking target value as a reference target value at an output.

With the inventive brake actuator and the inventive method for braking a vehicle, braking processes can be safely regulated in an advantageous manner, even under the predefined first switching conditions, without having to have recourse immediately to a passive fallback level.

Preferably the wheel slide protection monitoring device should switch over from the first position to the second position when at least one of the following predefined first switching conditions is fulfilled:

[a] When the wheel slide protection corrected braking target value is unchanged and therefore smaller than the braking target value over a predetermined first period,

[b] When the wheel slide protection corrected braking target value is unchanged or falls over a predetermined second period and in this case is smaller than the braking target value,

[c] When the wheel slide protection corrected braking target value is larger than the braking target value over a predetermined third period,

[d] When the wheel slide protection corrected braking target value is invalid data, i.e. when the wheel slide protection corrected braking target value is a data value that has been recognized as invalid during data checking.

There should preferably be switching from the second position back to the first position when the following predefined second switching condition is fulfilled:

[e] When none of the predefined first switching conditions is fulfilled over a predetermined fourth period.

In addition a further wheel slide protection monitoring device is seen as advantageous, at which the wheel slide protection corrected braking target value and the braking target value are available and which is suitably configured to switch from a first position to a second position under at least one further predefined first switching condition and to switch from the second position back to the first position under at least one further predefined second switching condition, wherein in the first position the wheel slide protection corrected braking target value and in the second position the braking target value is provided as monitoring target value at an output of the further wheel slide protection monitoring device.

Preferably the further wheel slide protection monitoring device should switch from the first position to the second position when at least one of the following four predefined first switching conditions is fulfilled:

[f] When the wheel slide protection corrected braking target value is unchanged and therefore smaller than the braking target value over a further predetermined first period,

[g] When the wheel slide protection corrected braking target value is unchanged or falls over a further predetermined second period and in this case is smaller than the braking target value,

[h] When the wheel slide protection corrected braking target value is larger than the braking target value over a further predetermined third period,

[i] When the wheel slide protection corrected braking target value is invalid data.

There should preferably be switching from the second position back to the first position when the following further predefined second switching condition is fulfilled:

[k] When none of the predefined first switching conditions is fulfilled over a further predetermined fourth period.

In this case it is seen as advantageous if the predetermined first period is shorter than the further predetermined first period, the predetermined second period is shorter than the further predetermined second period, the predetermined third period is longer than the further predetermined third period, the predetermined fourth period is longer than the further predetermined fourth period.

Preferably the inventive brake actuator has a target value regulation device which is suitably configured to acquire the reference target value provided at the output of the wheel slide protection monitoring device and an actual braking value acquired by means of a sensor device and to output at least one first output signal at its output so that the acquired actual braking value corresponds to the reference target value provided.

Furthermore the inventive brake actuator preferably has a fallback device that is suitably configured to provide at least one predefined second output signal at its output.

The inventive brake actuator also preferably has the following further devices:

A target value to force conversion device, which is suitably configured, under the influence of one of the output signals available on its input side, to actuate first braking means for friction locking with second braking means, An actual value monitoring device, which is suitably configured to acquire the monitoring target value provided at the output of the further wheel slide protection monitoring device and the actual braking value acquired by means of the sensor device and, in the event of impermissible discrepancies between the actual braking value and the monitoring target value provided, to output a switching signal and A switching device, which is suitably configured to acquire the switching signal of the actual value monitoring device and on input of the switching signal, to switch from the first switching position to the second switching position, wherein the target value to force conversion device, in the first switching position of the switching device, is connected on its input side to the output of the target value regulation device and in the second switching position of the switching device is connected on its input side to the output of the fallback device.

For further explanation of the invention

BRIEF DESCRIPTION OF THE SEVERAL VIEWS OF THE DRAWING

FIG. 1 shows an inventive rail vehicle with an inventive braking system, in which at least one inventive brake actuator is assigned to the wheelsets of bogies.

DESCRIPTION OF THE INVENTION

Figure 2B:
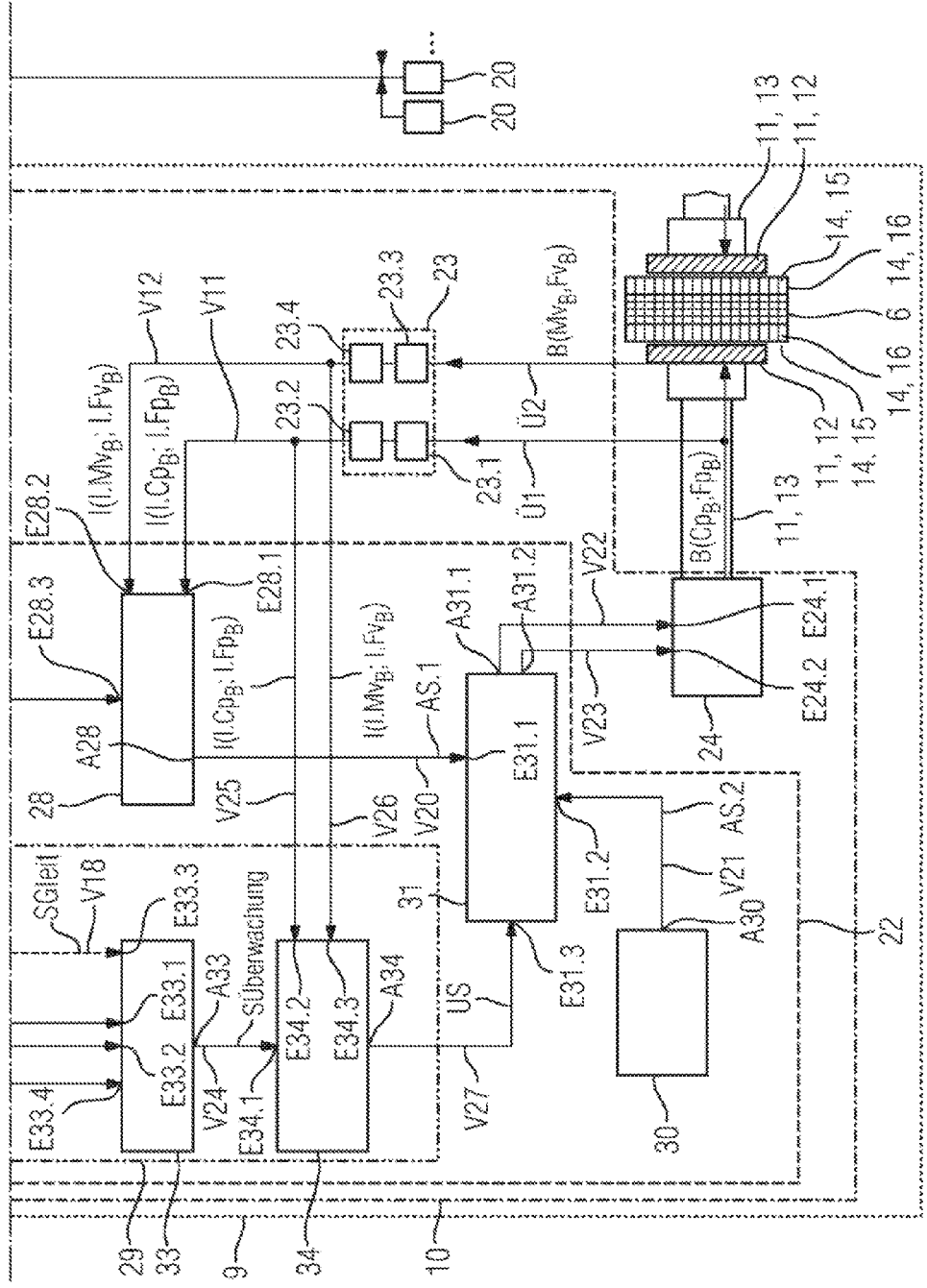
FIG. 2 shows one of the inventive brake actuators.

In accordance with FIG. 1 the rail vehicle 1 comprises cars 2.1, 2.2, . . . , 2.n on which the car bodies are carried, in a manner not shown here, via secondary springing in each case, by two sets of running gear in the form of bogies 3. The bogies 3 each have two wheelsets 4. The wheelsets 4 each have a shaft 5, at the end of which wheels 6 are held. In this case the shafts 5 of the wheelsets 4 are rotatably supported in a manner not shown here in wheelset bearings, which are linked via a housing and primary springing to a bogie frame 7 of the respective bogie 3. The rail vehicle 1 also has a braking system, designated overall by the number 8.

Each shaft 5 of the rail vehicle 1 is usually assigned at least one inventive brake unit 9 in each case. Thus each of the cars 2.1, 2.2, . . . , 2.n has at least four of these brake units 9.

Each of the brake units 9 has a brake actuator 10 and first braking means 11, in the form of a force transmission mechanism 13 provided with a brake lining 12 actuated by the brake actuator 10. In this case the first braking means 11 of each of these braking units 9 interacts in each case with its assigned second braking means 14 in the form of a braking element rotating with the shaft 5 and provided with at least one braking surface 15.

A wheel brake disk, a shaft brake disk, the wheel itself or a brake drum can serve as a braking element for example.

In the exemplary embodiment shown a wheel brake disk, which in accordance with FIG. 2 consists of two part brake disks 16, in each case, forms the second braking means 14, which is assigned to the first braking means 11. In addition, in the exemplary embodiment shown, the force transmission mechanism 13 of the first braking means 11 is embodied as a clamping device equipped with two brake linings 12 in the form of a brake caliper, which is held in a manner not shown here by means of a brake crosspiece on the bogie 3 that also carries the shaft 5 to be braked. The clamping device could however alternatively be embodied as a brake saddle.

The force transmission mechanism 13 provided with the brake linings 12 is able to be applied under the influence of the brake actuator 10 to establish a friction lock between the first braking means 11 and the second braking means 14 via the wheel brake disk formed from the two part brake disks 16.

The brake actuator 10 is an electro-hydraulic brake actuator in the exemplary embodiment shown in FIG. 1.

The braking system 8 has a central control device 17a and a brake control 17b in each of the cars 2.1, 2.2, . . . , 2.n. The central control 17a can be formed by a central vehicle control. The brake control 17b can be formed by one or, as shown here, by two brake control devices 17b.1 and 17b.2. In this case the brake control devices 17b.1 and 17b.2 are able to be controlled via a train bus 18a by the central control device 17a of the braking system 8.

The brake actuators 10 of the braking units 9 or groups of brake actuators 10 each receive a brake command via the brake control 17b. In this case the brake commands can be transmitted to the brake actuators 10 here via connection devices identified here overall by the number 18b in the form of one or more control lines and/or a data bus and/or wireless links.

FIG. 2 shows schematically one of the braking units 9 connected to the brake control 17b of one of the cars with an inventive brake actuator 10, to which a wheel slide protection control device 19 is assigned. The wheel slide protection control device 19 acquires the rotational speed of the wheels 6 of the respective shaft 5 via wheel speed sensors 20 and creates a reduction signal RS to limit the maximum wheel slip of the wheels 6. The reduction signal RS formed by the wheel slide protection control device 19 can be transmitted to the brake actuator 10 via a connection V1, which connects an output A19.1 to an input E17b.1, to the brake control 17b and optionally via a connection V2, which connects an output A19.2 to the interface E10.1. In this case the connections V1 and V2 can be embodied in the form of one or more control lines and/or a data bus and/or wireless connections.

The brake actuator 10 includes local electronics 22, a sensor device 23 and an electro-hydraulic target value to force conversion device 24, wherein the brake actuator, with its components 22, 23 and 24 and the first braking means 11, is connected by means of the connecting part not shown here to the braking unit 9. The brake actuator 10 and the first braking means are thus part of the braking unit 9, which is configured as a whole for installation on the bogie 3 shown schematically in FIG. 1, on which the shaft 5 is also held. The second braking means 14 assigned to the first braking means 11 rotates with the shaft 5.

The interaction between the local electronics 22, the sensor device 23 and the electro-hydraulic target value to force conversion device 24 is described in greater detail below with reference to FIG. 2.

The local electronics 22 forms a target value acquisition unit 25, which can be provided with a target value correction device in the form of a wheel slide protection correction device 26 and which has a wheel slide protection monitoring device 27.

In addition the local electronics 22 forms a target value regulation device 28, a monitoring unit 29, a fallback device 30 and a switching device 31. The fallback device 30 forms a passive fallback level.

The monitoring unit 29 can be provided with a further wheel slide protection correction device 32 and has a further wheel slide protection monitoring device 33 and an actual value monitoring device 34.

FIG. 2 shows further interfaces E10.2, E10.3 and E10.4 of the brake actuator 10 in addition to interface E10.1, which are connected via connections V3, V4 and V5 of the connecting device labeled 18b in FIG. 1 to the brake control 17b. However it must be mentioned in addition that, for improved clarity, not all interfaces of the brake actuator 10 are shown. Not shown in particular is an interface to a power supply of the brake actuator 10.

As a function of the braking command the brake control 17b sends a braking target value SSoll of a braking variable B to be regulated to the wheel slide protection monitoring device 27 located in the brake actuator 10 via the connection V3, which connects an output A17b.1 to the interface E10.2, and a connection V6, which connects the interface E10.2 to an input E27.1. Furthermore the brake control 17b sends a wheel slide protection corrected braking target value SGleit of the braking variable B to be regulated to the wheel slide protection monitoring device 27 via the connection V4, which connects an output A17b.2 to the interface E10.3, and a connection V7, which connects the interface E10.3 to an input E27.2. The wheel slide protection monitoring device 27 forms a first level of wheel slide protection monitoring.

The braking target value SSoll, which the brake actuator 10 receives from the brake control 17b, corresponds in the operational braking situation to an operational braking target value and in the rapid braking situation to a rapid braking target value.

As an alternative to this, the braking target value SSoll can be sent to the wheel slide protection monitoring device 27 and via the connection V3 and a connection V8, which connects the interface E10.2 to an input E26.1, to the wheel slide protection correction device 26. In this alternate case the wheel slide protection correction device 26 receives the reduction signal RS via a connection V9, which connects the interface E10.1 to an input E26.2. With the aid of the reduction signal RS the wheel slide protection correction device 26 makes a correction of the braking target value SSoll. The wheel slide protection correction device 26 makes the braking target value corrected in this way available via a connection V10, which connects an output A26 to an input E27.3, to the wheel slide protection monitoring device 27 as a wheel slide protection corrected braking target value SGleit.

The braking target value SSoll of the braking variable B can be a target value $SSoll.Cp_B$; $SSoll.Fp_B$ of a pressure variable $Cp_B$; $Fp_B$ as braking variable or a target value $SSoll.Fv_B$; $SSoll.Mv_B$ of a deceleration variable $Fv_B$; $Mv_B$ as braking variable. In this case a hydraulic pressure $Cp_B$ or a pressure force $Fp_B$ can serve as a pressure variable and a deceleration force $Fv_B$ or a deceleration moment $Mv_B$ can serve as a deceleration variable. Accordingly the wheel slide protection corrected braking target value SGleit of the braking variable B can be a wheel slide protection corrected braking target value $SGleit.Cp_B$; $SGleit.Fp_B$ of the pressure variable $Cp_B$; $Fp_B$ or a wheel slide protection corrected braking target value $SGleit.Fv_B$; $SGleit.Mv_B$ of the deceleration variable $Fv_B$; $Mv_B$.

An actual braking value I—i.e. an actual value of the braking variable B—is acquired by the target value regulation device 28. The actual braking value I can be an actual value $I.Cp_B$; $IFp_B$ of the pressure variable $Cp_B$; $Fp_B$ acquired at the input E28.1 of the target value regulation device 28 or an actual value $I.Fv_B$; $IMv_B$ of the deceleration variable $Fv_B$; $Mv_B$ acquired at the input E28.2 of the target value regulation device 28. Accordingly the sensor device 23, which is a component of the braking unit 9, can establish via a transmission path Ü1 by means of a first sensor 23.1 the actual value $I.Cp_B$ of the hydraulic pressure as braking value or by means of a second sensor 23.2 can establish the actual value $I.Fp_B$ of the pressure force as braking variable and provide it via a connection V11 at the input E28.1 of the target value regulation device 28. As an alternative or in addition the sensor device 23 can establish via a transmission path U2 by means of a third sensor 23.3 the actual value $I.Fv_B$ of the deceleration force as braking variable or by means of a fourth sensor 23.4, the actual value $I.Mv_B$ or the deceleration torque as braking variable and provide it via a connection V12 at the input E28.2 of the target value regulation device 28.

The wheel slide protection monitoring device 27, at which the wheel slide protection corrected braking target value SGleit and the braking target value SSoll are present, is suitably configured to switch from a first position to a second position under at least one predefined first switching condition, and to switch from the second position back to the first position under at least one predefined second switching condition. In the first position the wheel slide protection corrected braking target value SGleit is provided as a reference target value SFührung at an output A27 of the wheel slide protection monitoring device 27. In the second position the braking target value SSoll is provided as a reference target value SFührung at the output A27 of the wheel slide protection monitoring device 27. The wheel slide protection monitoring device 27 transfers the reference target value SFührung to the target value regulation device 28 via a connection V13, which connects the output A27 of the wheel slide protection monitoring device 27 to the input E28.3 of the target value regulation device 28.

The wheel slide protection monitoring device 27 in this case is suitably configured to switch over from the first to the second position when at least one of the following predefined first switching conditions [a], [b], [c], [d] is fulfilled:

[a] When the wheel slide protection corrected braking target value SGleit is unchanged and therefore smaller than the braking target value SSoll over more than a predetermined first period T1.1 of preferably 4 seconds,

[b] When the wheel slide protection corrected braking target value SGleit is unchanged or falls over a predetermined second period T2.1 of preferably 8 seconds and in this case is smaller than the braking target value SSoll,

[c] When the wheel slide protection corrected braking target value SGleit is larger than the braking target value SSoll over a predetermined third period T3.1 of preferably 4 seconds,

[d] When the wheel slide protection corrected braking target value SGleit is invalid data.

Furthermore the wheel slide protection monitoring device 27 is suitably configured to switch over from the second back to the first position when at least one of the following predefined second switching conditions ([e]) is fulfilled:

[e] When none of the predefined first switching conditions ([a], [b], [c], [d]) is fulfilled over a predetermined fourth period T4.1 of preferably 20 seconds.

In other words, the reference target value SFührung, which forms the input variable for the target value regulation device 28, is determined as follows:

Basically the wheel slide protection corrected braking target value SGleit is used as an input variable for the target value regulation device 28: SFührung=SGleit.

However SFührung is switched to SSoll when

SGleit<SSoll and SGleit is unchanged for more than 4 seconds

OR

SGleit<SSoll and no positive rise in SGleit is detectable within 8 seconds

OR

SGleit>SSoll for more than 4 seconds

OR

SGleit is invalid data.

There is a switch back from SFührung to SGleit when none of the above-mentioned predefined first switching conditions is fulfilled for more than 20 seconds.

In parallel to the wheel slide protection monitoring device 27, the further wheel slide protection monitoring device 33 also receives the braking target value SSoll from the brake control 17b via a connection V14, which connects the interface E10.2 with an input E33.1 of the further wheel slide protection monitoring device 33. Furthermore the further wheel slide protection monitoring device 33 receives the wheel slide protection corrected braking target value SGleit from the brake control 17b via a connection V15, which connects the interface E10.3 to an input E33.2 of the further wheel slide protection monitoring device 33. The further wheel slide protection monitoring device 33 forms a second level of wheel slide protection monitoring.

As an alternative hereto, the braking target value SSoll can be sent to the further wheel slide protection monitoring device 33 and via the connection V3 and a connection V16, which connects the interface E10.2 to an input E32.1, to the further wheel slide protection correction device 32. In this alternate case the further wheel slide protection correction device 32 receives the reduction signal RS via a connection V17, which connects the interface E10.1 to an input E32.2. With the aid of the reduction signal RS the further wheel slide protection correction device 32 makes a correction to the braking target value SSoll. The further wheel slide protection correction device 32 makes the braking target value corrected in this way available via a connection V18, which connects an output A32 to an input E33.3, as wheel slide protection corrected braking target value SGleit, to the further wheel slide protection monitoring device 33.

Via the connection V5, which connects an output A17b.3 of the brake control to the interface E10.4, and a connection V19, which connects the interface E10.4 to an input E33.4 of the further wheel slide protection monitoring device 33, in the event of rapid braking, a rapid braking signal SBaktiv can be transmitted from the brake control 17b to the further wheel slide protection monitoring device 33.

The further wheel slide protection monitoring device 33 is especially suitably configured for the rapid braking situation, to switch under at least one further predefined first switching condition from a first position to a second position and to switch from the second position back to the first position under at least one predefined second switching condition. In the first position the wheel slide protection corrected braking target value SGleit is provided as a monitoring target value SÜberwachung at an output A33 of the further wheel slide protection monitoring device 33. In the second position the braking target value SSoll is provided as a monitoring target value SÜberwachung at the output A33 of the further wheel slide protection monitoring device 33.

The further wheel slide protection monitoring device 33 is suitably configured in this case to switch from the first position to the second position when at least one of the following further predefined switching conditions ([f], [g], [h], [i]) is fulfilled:

[f] When the wheel slide protection corrected braking target value (SGleit) is unchanged and therefore smaller than the braking target value (SSoll) over a further predetermined first period (T1.2),

[g] When the wheel slide protection corrected braking target value (SGleit) is unchanged or falls over a further predetermined second period (T2.2) and in this case is smaller than the braking target value (SSoll),

[h] When the wheel slide protection corrected braking target value (SGleit) is larger than the braking target value (SSoll) over a further predetermined third period (T3.2),

[i] When the wheel slide protection corrected braking target value (SGleit) is invalid data.

Furthermore the further wheel slide protection monitoring device 33 is suitably configured in this case to switch from the second position back to the first position when at least one of the following further predefined switching conditions ([k]) is fulfilled:
  [k] When none of the further predefined first switching conditions ([f], [g], [h], [i]) is fulfilled over a further predetermined fourth period (T4.2).

In other words, under rapid braking conditions—i.e. with an activated rapid braking signal SBaktiv—the monitoring target value SÜberwachung is formed as follows:

Basically the wheel slide protection braking target value SGleit is used as the input variable for the actual value monitoring device 34: SÜberwachung=SGleit.

SÜberwachung is switched to SSoll however, when
  SGleit<SSoll and SGleit is unchanged for more than 5 seconds
OR
  SGleit<SSoll and no positive rise in SGleit is detectable within 10 seconds
OR
  SGleit>SSoll for more than 3 seconds
OR
  SGleit is invalid data.

There is a switch back from SÜberwachung to SGleit when none of the above-mentioned further predefined first switching conditions is fulfilled for more than 19 seconds.

The predetermined first period T1.1 is thus shorter than the further predetermined first period T1.2. The predetermined second period T2.1 is shorter than the further predetermined second period T2.2. The predetermined third period T3.1 is longer than the further predetermined third period T3.2. In addition the predetermined fourth period T4.1 is longer than the further predetermined fourth period T4.2. This guarantees that the first level of wheel slide protection monitoring responds initially and thus the braking variable B can be built up in a controlled manner to the braking target value SSoll. When the second level of wheel slide protection monitoring responds, the switch to the passive fallback level takes place. Regulation of the braking variable B is then no longer possible.

The target value regulation device 28 in this case acquires the reference target value SFührung provided at output A27 and the braking value I acquired by means of the sensor device 23 and—to control the braking variable V—outputs a first output signal AS.1 at an output A28 so that the acquired braking value I corresponds to the reference target value SFührung transferred by the wheel slide protection monitoring device 27 to the target value regulation device 28.

In the regulation of the pressure variable $Cp_B$; $Fp_B$ as braking variable B the target value regulation device 28 outputs the first output signal AS.1 so that the acquired actual value $I.Cp_B$; $I.Cp_B$ corresponds to the reference target value SFührung, wherein in the first switching position of the first wheel slide protection monitoring device, $SGleit.Cp_B$; $SGleit.Cp_B$ forms the reference target value SFührung and in the second switching position of the first wheel slide protection monitoring device, $SSoll.Cp_B$; $SSoll.Fp_B$ forms the reference target value SFührung.

In the regulation of the deceleration variable $Fv_B$; $Mv_B$ as braking variable B the target value regulation device 28 outputs the first output signal AS.1 so that the acquired actual value $I.Fv_B$; $I.Mv_B$ corresponds to the reference target value SFührung, wherein in the first switching position of the first wheel slide protection monitoring device, $SGleit.Fv_B$; $SGleit.Mv_B$ forms the reference target value SFührung and in the second switching position of the first wheel slide protection monitoring device, $SSoll.Mv_B$; $SSoll.Mv_B$ forms the reference target value SFührung.

The fallback device 30 provides a second output signal AS.2 at its output A30.

The first output signal AS.1 is available via a connection V20 at an input E31.1 of the switching device 31. The second output signal AS.2 is available via a connection V21 at an input E31.2 of the switching device 31.

The target value to force conversion device 24 actuates the first braking means 11 under the influence of one of the two output signals AS.1, AS.2 available on the input side for friction locking with the second braking means 14. A connection V22 connects an output A31.1 of the switching device 31 to an input E24.1 of the target value to force conversion device 24 and a connection V23 connects an output A31.2 of the switching device 31 to an input E24.2 of the target value to force conversion device 24.

The actual value monitoring device 34 acquires, via a connection V24 at an input E34.1 the monitoring target value SÜberwachung provided at the output A33 of the further wheel slide protection monitoring device 33. The actual value monitoring device 34 further acquires, via a connection V25, at an input E34.2, the actual braking value I acquired by means of the sensor device 23 as actual value $I.Cp_B$; $IFp_B$. As an alternative or in addition the actual value monitoring device 34 acquires, via a connection V26, at an input E34.3, the actual value $I.Fv_B$; $I.Mv_B$ acquired by means of the sensor device 23 as actual braking value I. For impermissible deviations of the actual braking value I from the monitoring target value SÜberwachung provided—especially when the acquired actual braking value is below the monitoring target value SÜberwachung provided for a parameterizable time—the actual value monitoring device 34 outputs a switching signal US at an output A34.

The actual value monitoring device 34 thus compares the monitoring target value SÜberwachung with the acquired actual braking value I. If the acquired actual braking value I falls below the monitoring target value SÜberwachung for the parameterizable time then the switching signal US is output at output A34.

The switching device 31 acquires the switching signal US of the actual value monitoring device 34 via a connection V27 at an input E31.3. On input of the switching signal US the switching device 31 switches from a first switching position into a second switching position, wherein the target value to force conversion device 24, in the first switching position of the switching device 31, is connected on its input side to the output of the target value regulation device 28 and in the second switching position of the switching device 31, is connected on its input side to the output of the fallback device 30.

The switching device 31, in its first switching position, thus connects the output A28 of the target value control to the input E24.1 of the target value to force conversion device 24, so that the first output signal AS.1 is available at the input E24.1 of the target value to force conversion device 24. In the second switching position, with an active switching signal US, the switching device 31 connects the output A30 of the fallback device 30 to the input E24.1 of the target value to force conversion device 24, so that the second output signal AS.2 of the fallback device 30 is available at the input E24.1.

The target value to force conversion device 24 can especially be embodied in accordance with the applicant's earlier application, which has been submitted to the German Patent Office under the application file reference 102013201623.9. In this document the target value regulation device 28, for controlling the braking variable, outputs as the first output signal two part signals AS.1.1 and AS.1.2, of which one, AS.1.1, controls a pump unit and the other, AS.1.2, controls a brake valve. In this case hydraulic fluid is pumped by the pump unit into a brake cylinder and hydraulic fluid is let out of the brake cylinder by means of the brake valve. The second output signal AS.2 of the fallback device 30 in this case causes a rapid braking valve to open in order to impart a pre-tensioning pressure of a pressure generator to the brake cylinder.

The inventive method enables the wheel slide protection monitoring prescribed in the regulations UIC541-05 or EN15595 to be carried out directly by the inventive brake actuators 10 of the braking system 8. By comparison with conventional braking systems, said system enables significant savings to be made in development and parts costs. In addition the availability of the overall braking system 8 is improved, since no additional electronic unit is necessary.

In accordance with the invention the wheel slide protection monitoring is thus not embodied as an additional monitoring unit of a wheel slide protection arrangement, but is assigned as a monitoring function to the brake actuators. Each brake actuator carries out on its own monitoring of the wheel slide protection corrected braking target value SGleit independent of the wheel slide protection control device 19 and, in the event of impermissible deviations, provides the target brake value SSoll as the reference target value (substitute target brake value) SFührung instead of the wheel slide protection corrected braking target value SGleit.

The monitoring of the wheel slide protection protected braking target value SGleit of each of the brake actuators 10 of the braking system 8 and the output of the target brake value SSoll as reference target value (substitute target brake value) on response of the wheel slide protection monitoring device 27 of the respective brake actuator occurs in such cases at the end of the signal chain. A falsification of the respective wheel slide protection protected braking target value SGleit—for example as part of the connection device 18b or in the input interface E10.3—can thus likewise be acquired and recognized.

Brake actuators, which are embodied in respect of their safety architecture so that, even in the emergency or rapid braking situations known to the person skilled in the art, they generate a controlled braking variable, already have a safety architecture that is also demanded for independent wheel slide protection monitoring. Thus, with these types of brake actuator, in addition to the said components which are used for integration of the wheel slide protection monitoring into the brake actuators, no further electronic components—i.e. no additional effort—is necessary for safeguarding the safety architecture required.

The invention claimed is:

1. A brake actuator for a braking system of a rail vehicle, the brake actuator comprising:
    a wheel slide protection correction device configured for correcting a target brake value acquired by a brake controller by means of a reduction signal of a wheel slide protection control device to a wheel slide protection corrected braking target value or the brake actuator acquiring the wheel slide protection corrected braking target value from the brake controller; and
    a wheel slide protection monitoring device having an output and receiving the wheel slide protection corrected braking target value and the target brake value, said wheel slide protection monitoring device configure:
        under at least one predefined first switching condition, to switch from a first position into a second position, and,
        under at least one predefined second switching condition, to switch from the second position back to the first position,
    wherein in the first position the wheel slide protection corrected braking target value is provided as a reference target value at said output of said wheel slide protection monitoring device, and in the second position the target brake value is provided as the reference target value at said output of said wheel slide protection monitoring device;
    wherein the brake actuator controls a braking variable of the braking system of the rail vehicle based on the wheel slide protection corrected braking target value in the first position of the wheel slide protection monitoring device and the target brake value in the second position of the wheel slide protection monitoring device.

2. The brake actuator according to claim 1, wherein said wheel slide protection monitoring device is configured to switch from the first position to the second position when the predefined first switching condition is fulfilled, the predefined first switching condition is selected from the group consisting of:
    when the wheel slide protection corrected braking target value is unchanged and is smaller than the braking target value over a predetermined first period;
    when the wheel slide protection corrected braking target value is unchanged or falls over a predetermined second period, and is smaller than the braking target value;
    when the wheel slide protection corrected braking target value is larger than the braking target value over a predetermined third period; and
    when the wheel slide protection corrected braking target value is invalid.

3. The brake actuator according to claim 2, wherein said wheel slide protection monitoring device is configured to switch from the second position back to the first position when the predefined second switching condition is fulfilled, the predefined second switching condition is fulfilled when none of the predefined first switching conditions is fulfilled over a predetermined fourth period.

4. The brake actuator according to claim 2, further comprising a further wheel slide protection monitoring device having an output and receiving the wheel slide protection corrected braking target value and the braking target value, said further wheel slide protection monitoring device configured:
    under at least one further predefined first switching condition, to switch from the first position to the second position, and
    under at least one further predefined second switching condition to switch from the second position back to the first position,
    wherein, in the first position, the wheel slide protection corrected braking target value and in the second position the braking target value is provided as a monitoring target value at said output of said further wheel slide protection monitoring device.

5. The brake actuator according to claim 4, wherein said further wheel slide protection monitoring device is configured to switch from the first position to the second position when the further predefined first switching condition is fulfilled, the further predefined first switching condition is selected from the group consisting of:

when the wheel slide protection corrected braking target value is unchanged and is smaller than the braking target value over a further predetermined first period;

when the wheel slide protection corrected braking target value is unchanged or falls over a further predetermined second period, and is smaller than the braking target value;

when the wheel slide protection corrected braking target value is larger than the braking target value over a further predetermined third period; and when the wheel slide protection corrected braking target value is invalid.

6. The brake actuator according to claim 5, wherein said further wheel slide protection monitoring device is configured to switch from the second position back to the first position when the further predefined second switching conditions is fulfilled and the further predefined second switching condition is fulfilled when none of the further predefined first switching conditions is fulfilled over a further predetermined fourth period.

7. The brake actuator according to claim 6, wherein:
the predetermined first period is shorter than the further predetermined first period;
the predetermined second period is shorter than the further predetermined second period;
the predetermined third period is longer than the further predetermined third period; and
the predetermined fourth period is longer than the further predetermined fourth period.

8. The brake actuator according to claim 4, further comprising
a sensor device; and
a target value regulation device configured to acquire the reference target value provided at said output of said wheel slide protection monitoring device and an actual braking value acquired by means of said sensor device, said target value regulation device having an output outputting at least one first output signal so that the actual braking value acquired corresponds to the reference target value.

9. The brake actuator according to claim 8, further comprising a fallback device having an output and configured to provide at least one second output signal at said output of said fallback device.

10. The brake actuator according to claim 9, further comprising:
a target value to force conversion device having an input side and configured, under an influence of one of the first and second output signals present on said input side, to actuate first braking mechanism for friction locking with second braking device;
an actual value monitoring device configured to acquire the monitoring target value provided at said output of said further wheel slide protection monitoring device and the actual braking value acquired by means of said sensor device and, in an event of impermissible discrepancies between the actual braking value and the monitoring target value provided, said actual value monitoring device outputting a switching signal; and
a switching device configured to acquire the switching signal of said actual value monitoring device and on input of the switching signal, to switch from a first switching position to a second switching position,
wherein said target value to force conversion device, in the first switching position of said switching device, is connected on said input side to said output of said target value regulation device and in the second switching position of said switching device is connected on said input side to said output of said fallback device.

11. A braking system for braking a rail vehicle, comprising:
a brake controller;
a wheel slide protection control device;
first braking mechanism;
second braking device interacted with said first braking mechanism;
a brake actuator having a target value to force conversion device actuating said first braking mechanism for making a friction lock with said second braking device, forming a braking apparatus, being configured for converting an output signal from an input of said target value to force conversion device to an actual braking value, said brake actuator further containing:
a wheel slide protection correction device configured for correcting a target brake value acquired by said brake controller by means of a reduction signal of said wheel slide protection control device to a wheel slide protection corrected braking target value or the brake actuator acquiring the wheel slide protection corrected braking target value from the brake controller; and
a wheel slide protection monitoring device having an output and receiving the wheel slide protection corrected braking target value and the target brake value, said wheel slide protection monitoring device configured:
under at least one predefined first switching condition, to switch from a first position into a second position, and,
under at least one predefined second switching condition, to switch from the second position back to the first position,
wherein in the first position the wheel slide protection corrected braking target value is provided as reference target value at said output of said wheel slide protection monitoring device and in the second position the target brake value is provided as the reference target value at said output of said wheel slide protection monitoring device;
wherein the brake actuator controls a braking variable of the braking system of the rail vehicle based on the wheel slide protection corrected braking target value in the first position of the wheel slide protection monitoring device and the target brake value in the second position of the wheel slide protection monitoring device.

12. The braking system according to claim 11, wherein said brake actuator and said first braking mechanism are part of a brake unit, which is configured as a whole for installation on a bogie of the rail vehicle.

13. A rail vehicle, comprising the braking system according to claim 11.

14. A method for braking a rail vehicle, comprising:
acquiring in a brake actuator, a wheel slide protection corrected braking target value from a brake controller, or from a wheel slide protection correction device of the brake actuator which corrects a braking target value acquired by the brake controller by means of a reduction signal of a wheel slide protection control device to the wheel slide protection corrected braking target value; and
acquiring in a wheel slide protection monitoring device of the brake actuator the wheel slide protection corrected braking target value and the braking target value, the wheel slide protection monitoring device, under at least one predefined first switching condition, switches from a first position into a second position of the brake actuator, and under at least one predefined second switching condition, switches from the second position to the first position, wherein the wheel slide protection monitoring device, in the first position, provides the wheel slide protection corrected braking target value and in the second position the braking target value as a reference target value at an output;

wherein the brake actuator controls a braking variable of the braking system of the rail vehicle based on the wheel slide protection corrected braking target value in the first position of the wheel slide protection monitoring device and the target brake value in the second position of the wheel slide protection monitoring device.

15. The method according to claim 14, wherein the wheel slide protection monitoring device switches from the first position to the second position when any one of the following predefined first switching conditions is fulfilled:
- when the wheel slide protection corrected braking target value is unchanged and is smaller than the braking target value over a predetermined first period;
- when the wheel slide protection corrected braking target value is unchanged or falls over a predetermined second period, and is smaller than the braking target value;
- when the wheel slide protection corrected braking target value is larger than the braking target value over a predetermined third period; and
- when the wheel slide protection corrected braking target value is invalid.

16. The method according to claim 15, wherein the wheel slide protection monitoring device switches from the second position back to the first position when the predefined second switching condition is fulfilled and when none of the predefined first switching conditions is fulfilled over a predetermined fourth period.

17. The method according to claim 14, which further comprises acquiring in a further wheel slide protection monitoring device of the brake actuator the wheel slide protection corrected braking target value and the braking target value, the further wheel slide protection monitoring device, under at least one further predefined first switching condition, switches from a first position into a second position, and under at least one further predefined second switching condition, switches from the second position back to the first position, wherein in the first position, the further wheel slide protection monitoring device provides the wheel slide protection corrected braking target value and in the second position the braking target value as a monitoring target value at an output.

18. The method according to claim 17, wherein the further wheel slide protection monitoring device switches from the first to the second position when any one of the following first switching conditions is fulfilled:
- when the wheel slide protection corrected braking target value is unchanged and is smaller than the braking target value over a further predetermined first period;
- when the wheel slide protection corrected braking target value is unchanged or falls over a further predetermined second period, and is smaller than the braking target value;
- when the wheel slide protection corrected braking target value is larger than the braking target value over a further predetermined third period; and
- when the wheel slide protection corrected braking target value is invalid.

19. The method according to claim 18, wherein the further wheel slide protection monitoring device switches from the second position back to the first position when the further predefined second switching conditions is fulfilled and when none of the further predefined first switching conditions is fulfilled over a further predetermined fourth period.

20. The method according to claim 19, which further comprises:
- setting the predetermined first period to be shorter than the further predetermined first period;
- setting the predetermined second period to be shorter than the further predetermined second period;
- setting the predetermined third period to be longer than the further predetermined third period; and
- setting the predetermined fourth period to be longer than the further predetermined fourth period.

* * * * *